March 27, 1951 G. BRIGGS 2,546,628
ELECTRONIC AMPLIFIER FOR THREE-PHASE CURRENT IMPULSES
Filed June 14, 1948
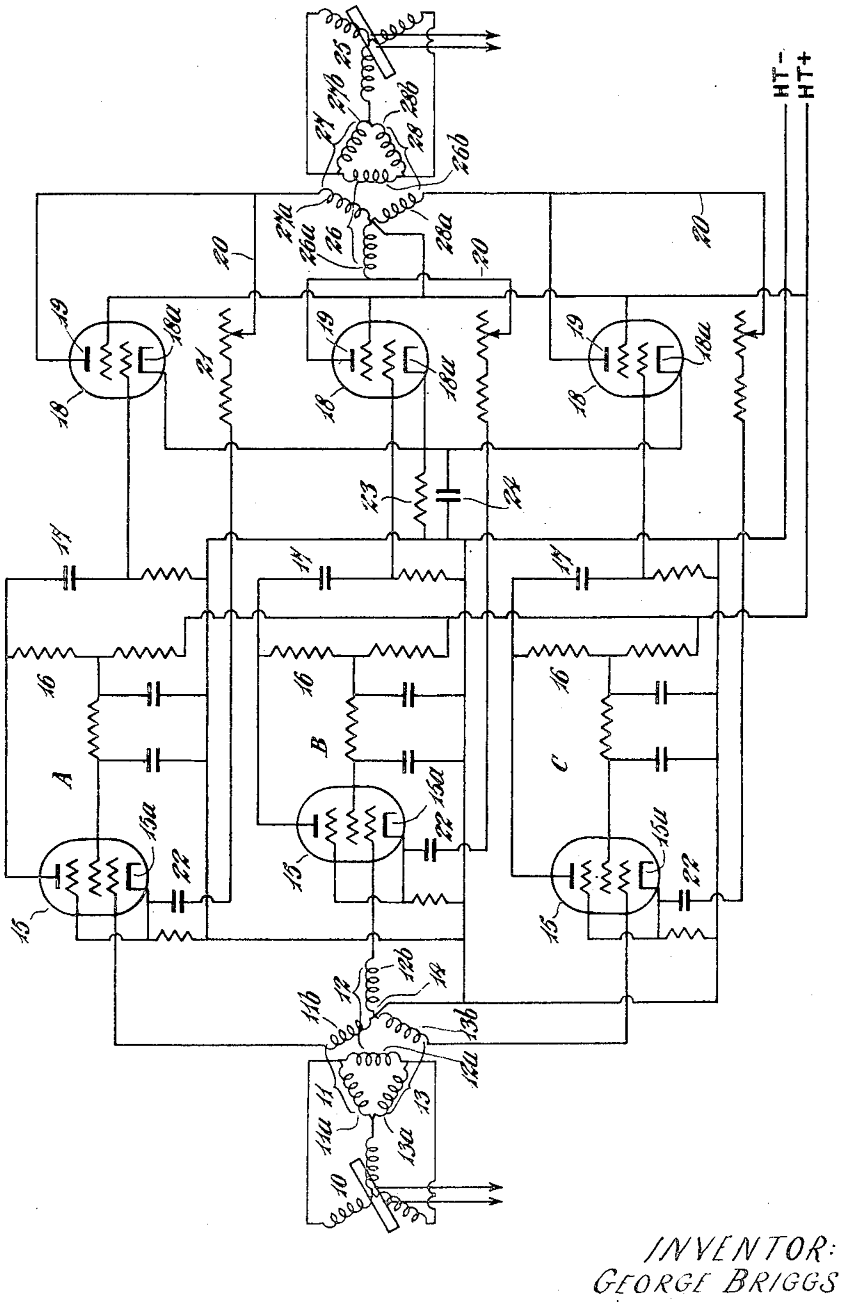
INVENTOR:
GEORGE BRIGGS
By Richardson, David and Nordon
Att'ys Patented Mar. 27, 1951 2,546,628

UNITED STATES PATENT OFFICE 2,546,628

ELECTRONIC AMPLIFIER FOR THREE-PHASE CURRENT IMPULSES

George Briggs, London, England, assignor to B. V. C. Electronics Developments Limited, London, England, a British company Application June 14, 1948, Serial No. 32,761
In Great Britain June 20, 1947

5 Claims. (Cl. 179—171)

This invention relates to electronic amplifiers and has for its chief object to provide an improved form of three phase amplifier which will be particularly applicable to the remote position indicator, or repeater compass, forming the subject matter of our co-pending patent application Serial No. 32,762, filed June 14, 1948, but which will, on the other hand, be generally applicable as an amplifier of three phase impulses.

The three phase amplifier according to the present invention comprises three electronic amplifier chains having transformer coupled inputs and transformer coupled outputs and is characterised in that the three primaries of the input transformers and the three secondaries of the output transformers are connected in delta whilst the three secondaries of the input transformers and the three primaries of the output transformers are connected in star.

Preferably, a negative feed-back is provided from the output valve of each amplifier chain to one of the preceding valves of that chain and the amount of negative feed-back is conveniently independently variable in each chain.

It is also convenient to provide the three output valves of the three chains with a common cathode resistor.

In order that this invention may be the more clearly understood and readily carried into effect, reference may be made to the accompanying drawing which shows the circuit diagram of a three phase amplifier according to the present invention as applied to a repeater compass of the kind forming the subject matter of our co-pending patent application Serial No. 32,762.

Referring now to the accompanying drawing, in the apparatus therein illustrated the three phase output from the master compass 10 (which is preferably of the form described in our copending application Serial No. 32,762) is fed through three transformers 11, 12 and 13 to three reasonably matched amplifiers A, B and C. The primaries 11*a*, 12*a* and 13*a* of the transformers 11, 12 and 13 are connected in delta and the secondaries 11*b*, 12*b* and 13*b* in star with the common point 14 earthed or returned to high tension negative. As the amplifiers A, B and C for the three phases are the same, only one need be described. The first stage 15, which should be of high gain to give maximum amplification and thereby permit of considerable negative feed back, is resistance capacity coupled, as at 16, 17, to a second stage amplifier 18 from the anode 19 of which a lead 20 is taken through a resistance 21 (variable if desired) and a condenser 22 to the cathode 15*a* of the first valve to give a negative feed back. The resistance 21 is preferably variable and forms one convenient method of making the necessary adjustments to line up the amplifier to the input and output. A point which should be noted in the amplifier shown in the drawing is that the cathodes 18*a* of the second stage valves 18 of all three amplifiers A, B and C are connected to a common cathode resistance 23 which is bye-passed by a condenser 24. More stages of amplification may of course be employed in the amplifiers A, B and C but in general the two stages illustrated will be found to be sufficient.

The outputs from the amplifiers A, B and C are fed to the repeater 25 through transformers 26, 27 and 28, the primaries 26*a*, 27*a* and 28*a* of which are connected in star and the secondaries 26*b*, 27*b* and 28*b* in delta.

Normally, it would appear to be a matter of great difficulty to provide a three phase balanced amplifier which would not distort the wave form or other characteristics of the incoming impulses and which would remain balanced within sufficiently fine limits over a long period. For example, even if the three phases of the amplifier were initially balanced it would seem that deterioration of the valves or replacement of one or more of the same would upset the balance. It has been found, however, that with the amplifier according to the present invention and as above described, quite large variations of valve characteristics in the individual amplifiers may be made without affecting the overall performance of the amplifier. Furthermore, failure of a valve in any one of the three chains of the amplifier will not cause the amplifier, as a whole, to cease to function and, it has been found that such a failure will only cause a small error in the output, say of the order of 5° in the case of a repeater compass.

Although the present invention is particularly applicable to three phase amplifiers for use in repeater compasses such as those forming the subject matter of our above mentioned co-pending patent application it is equally applicable to other similar remote position indicators and, in fact, to all apparatus where it is desired to amplify three phase impulses without distorting their wave form or other characteristics.

I claim:

1. A three phase amplifier, more particularly for use in remote position indicators of the kind set forth, comprising three electronic amplifier chains having transformer-coupled inputs and transformer-coupled outputs, the three primaries of the input transformers and the three secondaries of the output transformers being connected in delta whilst the three secondaries of the input transformers and the three primaries of the output transformers are connected in star, and a negative feed back from the output valve of each amplifier chain to one of the preceding valves in the chain.

2. A three phase amplifier, according to claim 1 in which the common point of the three star-connected secondaries of the input transformers is earthed or returned to high tension negative.

3. A three phase amplifier according to claim 1, in which the amount of negative feed back is independently variable in each chain.

4. A three phase amplifier according to claim 1, in which the output valves of the chains are provided with a common cathode resistor.

5. A three phase amplifier according to claim 1, in which the negative feed back comprises a lead, a resistance and a condenser in series.

GEORGE BRIGGS.

REFERENCES CITED

The following references are of record in the file of this patent:

UNITED STATES PATENTS

| Number | Name | Date |
|---|---|---|
| 1,898,366 | Lewis | Feb. 21, 1933 |

FOREIGN PATENTS

| Number | Country | Date |
|---|---|---|
| 573,706 | France | June 28, 1924 |